United States Patent

[11] 3,601,807

[72] Inventors William F. Beausoleil; Wilbur D. Pricer, both of Poughkeepsie, N.Y.

[21] Appl. No. 790,680
[22] Filed Jan. 13, 1969
[45] Patented Aug. 24, 1971

[73] Assignee International Business Machines Corporation Armonk, N.Y.

[54] CENTRALIZED CROSSPOINT SWITCHING UNIT
10 Claims, 9 Drawing Figs.

[52] U.S. Cl. .......... 340/166, 340/147 C
[51] Int. Cl. .......... H04q 5/14, H04m 3/22
[50] Field of Search .......... 340/166, 147 C; 179/18 Y

[56] References Cited

UNITED STATES PATENTS

| | | | |
|---|---|---|---|
| 3,105,224 | 9/1963 | Williams | 340/166 |
| 3,354,321 | 11/1967 | Meyer | 340/166 X |
| 3,402,392 | 9/1968 | Schroeder | 340/166 |
| 3,489,856 | 1/1970 | Brightman | 179/18.7 YA |
| 3,495,217 | 2/1970 | Brooks | 340/147 |

*Primary Examiner*—Donald J. Yusko
*Attorneys*—Hanifin and Jancin and Owen L. Lamb

ABSTRACT: An input/output interface switching apparatus for switching I/O interfaces connecting I/O control units between channels. A matrix of transistor cross-point switches is provided for attaching one or more strings of control units to one or more channels. These strings of control unit are switched between the channels under configuration control.

The cross-points are arranged so that a single failure within one interface affects at most only the channel to which the interface is associated. The switching matrix is physically centralized to minimize the number of I/O interface cables and connectors. The switching functions are, however, logically decentralized from a reliability standpoint so that a single component failure does not result in total switching system failure.

INVENTORS
WILLIAM F. BEAUSOLEIL
WILBUR D PRICER
BY Owen L. Lamb
ATTORNEY

SWITCH CONTROLLER

CONFIGURATION CONTROL UNIT - 14

CENTRALIZED CROSSPOINT SWITCHING UNIT

1. Background of the Invention
2. Summary of the Invention
3. Brief Description of the Drawings
4. General Description of the Interface Switching Unit
5. Configuration Control Unit
5.1 Addressing
5.2 Operations
5.3 Configuration States
5.3.1 Exclusive Configuration State
5.3.2 Shared Configuration State
5.3.3 Suspended Configuration State
5.3.4 Unconfigured State
5.4 Basic Commands
5.3.4 Unconfigured State
5.4 Basic Commands
5.4.1 No-Operation Control
5.4.2 Test I/O
5.4.3 Sense (Basic)
5.5 Configuration Commands
5.5.1 Configure Exclusively
5.5.2 Configure and Share
5.5.3 Reset and Configure
5.5.4 Disconnect and Suspend
5.5.5 Unconfigure
5.6 Sensing Commands
5.6.1 Sense Authorization States
5.6.2 Sense Entire Configuration
5.6.3 Sense Channel Configuration
5.7 Authorization States
5.8 Set Authorization Register
5.9 Status
5.9.1 Attention
5.9.2 Status Modifier
5.9.3 Control Unit End
5.9.4 Busy
5.9.5 Channel End
5.9.6 Device End
5.9.7 Unit Check
5.9.8 Unit Exception
5.10 Interface Sequences
5.10.1 System Reset
5.10.2 Selective Reset
5.10.3 Interface Disconnect
6. Switch Controller
6.1 Interface Addressing
6.2 Operating States
6.2.1 Connected State
6.2.2 Dedicated State
6.3 Initial Selection Sequence
6.4 Control Unit End
6.5 Interface Polling Sequence
6.6 Control Unit Initiated Sequence
7. Switching Matrix
8. Interface Switching Unit Versions
8.1 Multiple Interfaces Per Channel
8.2 Extended Device Addressing
8.3 Manual Steady State
8.4 Manually Controlled Configuration
8.5 Manually Controlled Sharing
8.6 Dynamic Sharing Option
9. Input/Output Interface Additions
9.1 New Interface Lines
9.1.1 Reset Out
9.1.2 Disconnect In
9.1.3 Allegiance In
9.1.4 Configure Out

1. BACKGROUND OF THE INVENTION

The invention relates generally to a transistor crosspoint switching element utilized in a switching matrix, and to the control circuits for performing switching functions.

Various I/O switching units have been utilized in the past for manually, or under program control, connecting one of a number of first modules to one of a number of second modules. Serious problems result when such switching units are adapted to high speed data processing systems which have requirements of high availability along with high reliability of operation. Some prior switching units have utilized relay circuits which are backed up by parallel circuits which take over the operation should a failure occur. This tends to be slow and very expensive. Prior transistor crosspoint require a local power supply, and introduce unacceptable signal delay.

It is an object of this invention to provide an improved crosspoint switch to enable a switching system to have high availability to thereby provide access to alternate units to keep the system functioning when a unit malfunction occurs.

It is an object of this invention to provide a switching element which does not offer appreciable delay or skew that would otherwise prevent the attachment of high speed units to a DC interlocked interface.

An object of this invention is to provide an improved crosspoint switch which enables a switching system to be modular.

An object of this invention is to provide a switching system which is logically distributed such that the probability is rare that component failure will affect the total availability of modules attached to the switching system.

An object of this invention is to provide a switching circuit such that the physical disconnection and reconnection of unconfigured I/O interface cables and thus, channels, control units and devices, can be accomplished for maintenance purposes without disrupting the operation of units not configured to the selected path.

It is also an object of this invention to provide an improved crosspoint switch matrix in which crosstalk through non-selected crosspoints is minimized.

2. SUMMARY OF THE INVENTION

The above objects are accomplished in accordance with the invention by a crosspoint switch utilizing a transistor which is operated in its base saturation region.

A switching matrix within the system is physically centralized and comprises a single transistor as each crosspoint switch (node) inserted directly in series with the lines to be switched. No power is necessary at the switch matrix itself since power to the transistor is supplied by means of the level the DC voltage level of the lines which are switched. All of the controls and powering for the crosspoints are decentralized and located at each controlling module.

The decentralized arrangement has the advantage that there is no requirement for a power supply and cooling fan in the switch matrix itself. Since the control is distributed in the controlling modules, the switching unit displays high reliability coupled with low cost.

When the transistor is switched on, it operates in saturation, which provides for very small signal delay and no change in the characteristic impedance on the interface lines being switched.

Since the controls are decentralized, lines can be physically removed without system disturbance.

The invention will be described for a computer system of the type fully described in Amdahl et al. U.S. Pat. No. 3,400,371, filed Apr. 6, 1964. The interface is described in Beausoleil et al. U.S. Pat. No. 3,336,582, filed Sept. 1, 1964.

3. BRIEF DESCRIPTION OF THE DRAWINGS

4. GENERAL DESCRIPTION OF THE INTERFACE SWITCHING UNIT

Figure 1:
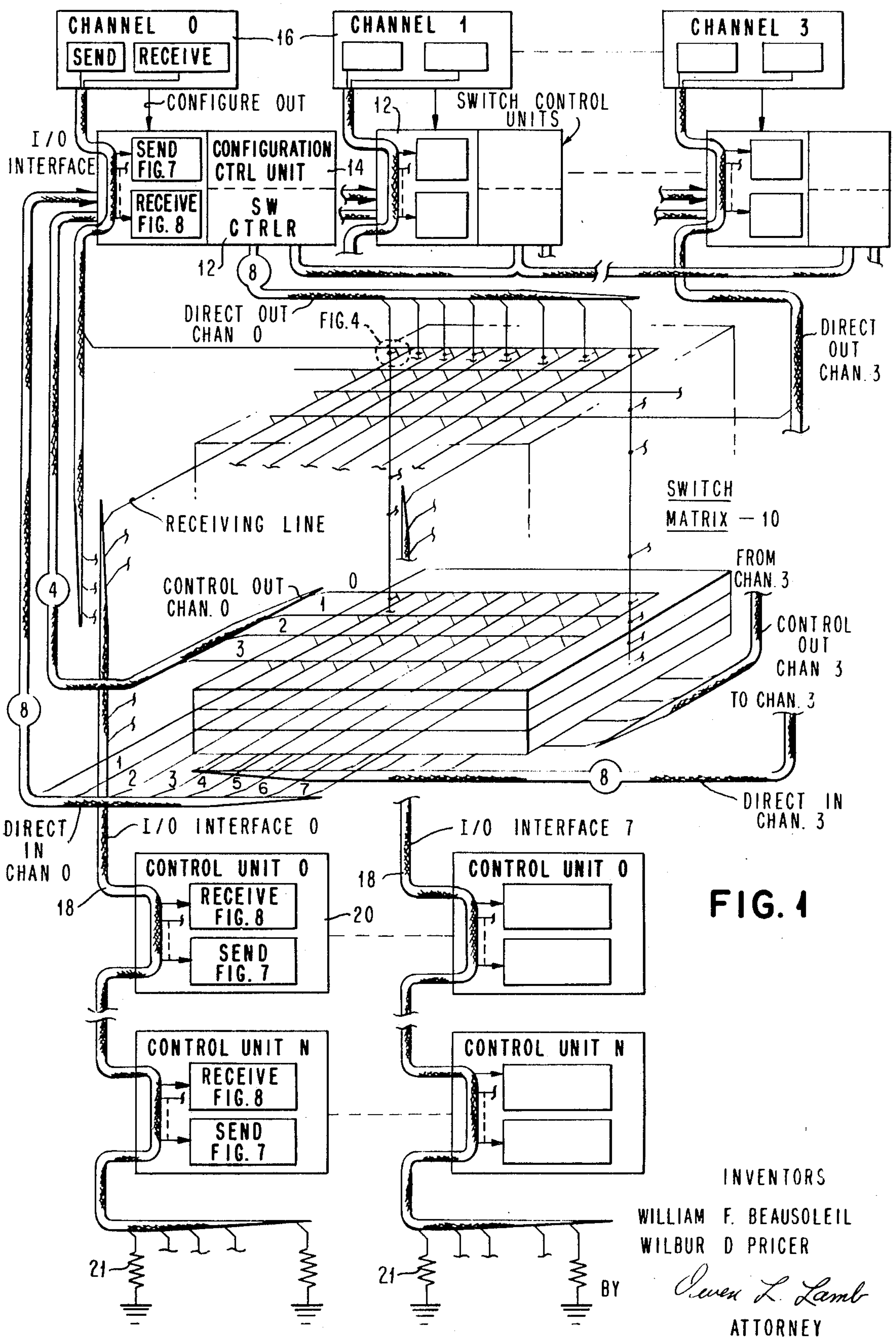
FIG. 1 is a block diagram of the system in which the invention is embodied.
Figure 2:
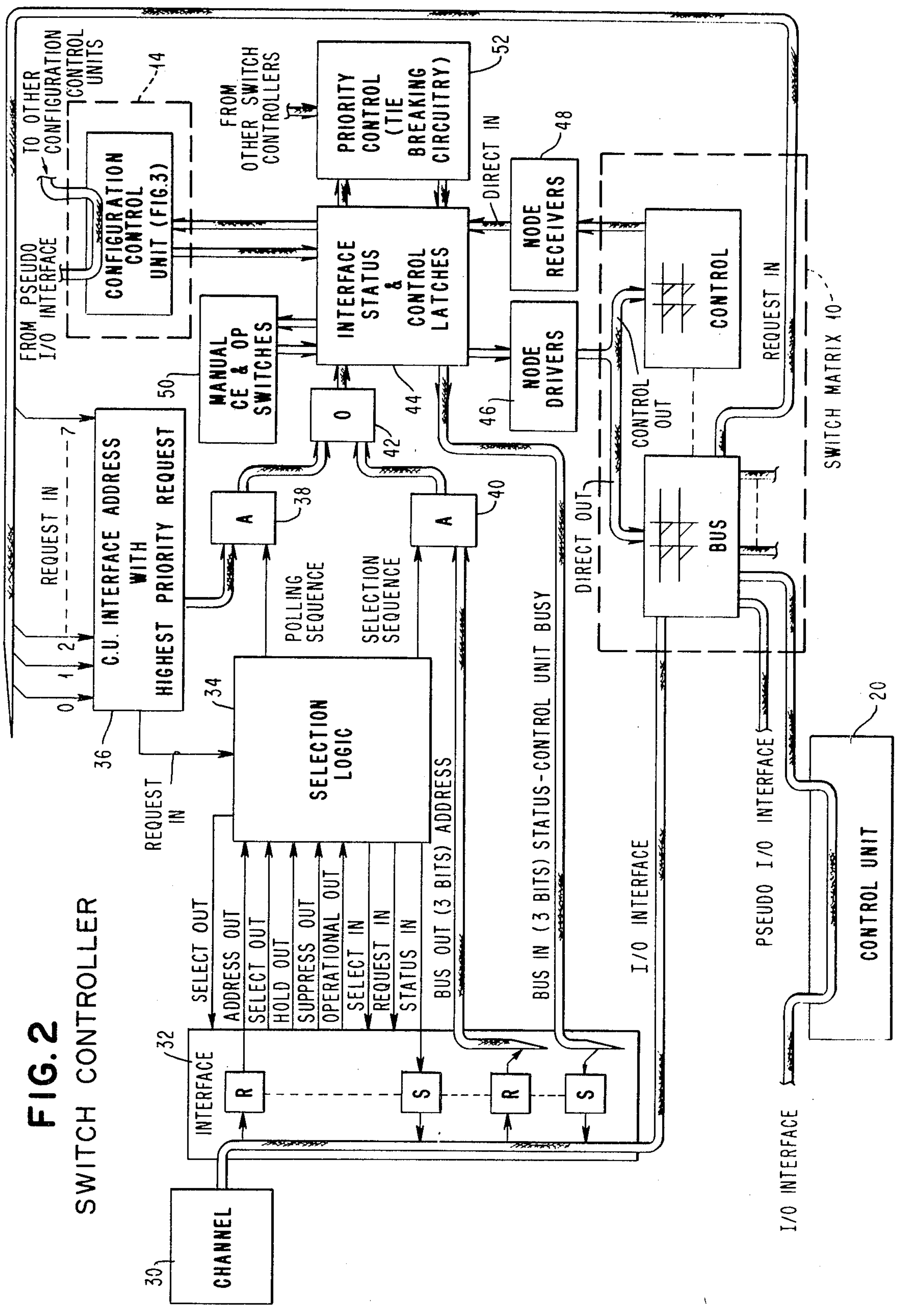
FIG. 2 is a block diagram of the switch controller 12 of FIG. 1.
Figure 3:
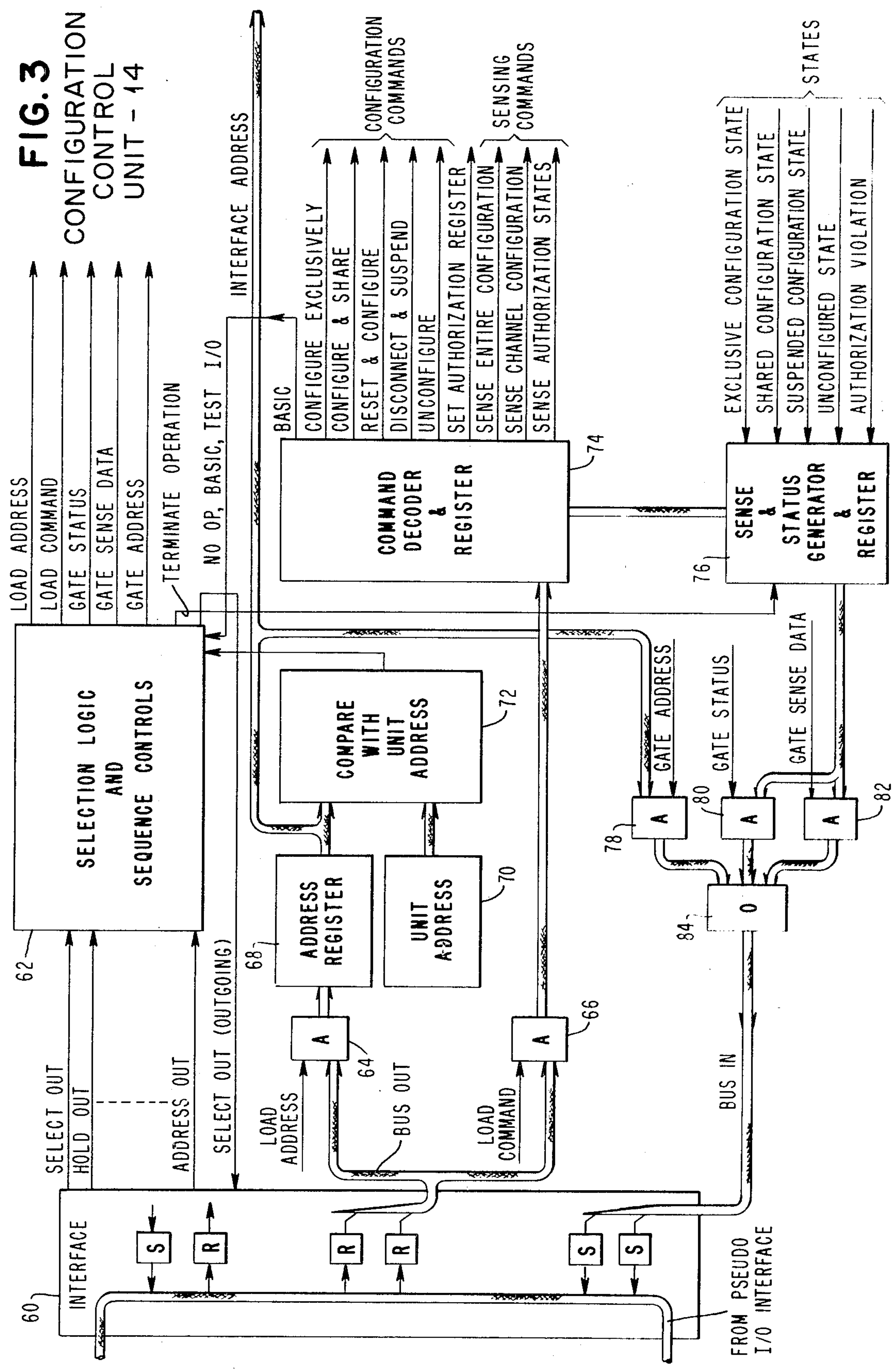
FIG. 3 is a block diagram of the configuration control unit 14 of FIGS. 1 and 2.

Referring to FIG. 1, the interface switching unit includes a switch matrix 10, switch controllers 12 (shown in more detail in FIG. 2) and configuration control units 14 (shown in more detail in FIG. 3).

Briefly, the switch matrix 10 provides the electrical cross-points (designated "nodes") between the channels 16 and the interfaces 18 which are attached to control units 20. The signal lines of each interface 18 are connected to terminators 21, which are typically characteristic impedance resistors, as described in column 6 of the above-identified Beausoleil et al. patent. This portion of the switch matrix 10 is called the bus portion and performs the switching function.

The lower four planes of the switch matrix 10 comprise the control portion and are used to indicate the status of the nodes of the bus portion of the switch matrix.

Associated with each channel 16 is a switch controller 12 and a configuration control unit 14. The switch controller essentially makes and breaks the nodes of the switch matrix 10 in response to signals from the channel over the I/O interface. The switch controller is a device which is transparent to the channel and the control unit, that is, the channel operates the I/O interface just as if the switch controller was not attached.

Configuration control units 14 are attached to one of the I/O interface strings 18, in the same manner as control units 20. The interface string set aside for this purpose will be referred to as the pseudointerface. (Shown in FIG. 2 but not in FIG. 1).

The configuration control unit 14 operates in conjunction with the channel 16, the control portion of the switch matrix 10, and the switch controller to automatically perform commands received from the channel, to set up switch matrix connections via the switch controller, and sense the actual state of the switch matrix by means of the control portion of the switch matrix.

The sensing of the state of the switch matrix is accomplished in the following manner. The switch controller 12 sets up a connection between the I/O interface of a channel and the I/O interface 18 of a control unit string by energizing the appropriate direct out line. The direct out line energizes crosspoints in a vertical column including the four planes of the control portion of the switch matrix. Sensing is performed by means of the configuration control unit placing a signal on the control out bus 0–3. An output will occur on the direct in bus for the corresponding channel in all of those matrix positions (within the control portion of the switch matrix) in which a crosspoint is closed. This is a direct indication as to which of the direct out lines are energized. The crosspoint switches of the control portion of the switch matrix are made available to all of the channels so that any channel can test the status of any other channel.

Figure 9:
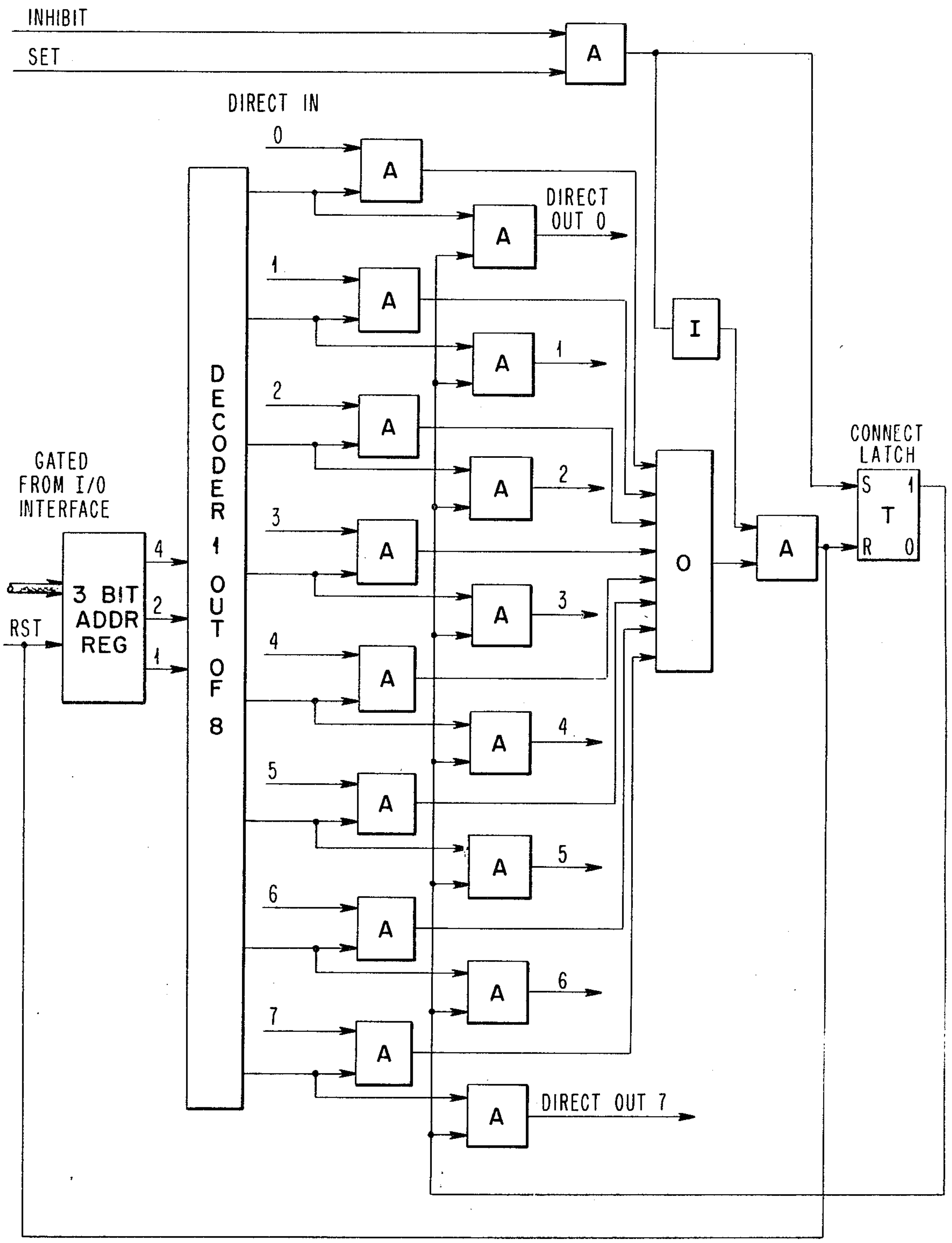
FIG. 9 is a block diagram of a decoder circuit for decoding an interface address and for energizing the direct out line for that interface.

Referring to FIG. 9, by utilizing the control out lines the switch controller can monitor the connections and disconnect when a connection by another switch controller is made. For example, the following procedure connects channel 1 to I/O interface number 4. The address stored in 3 Bit Address Register, gated from the I/O interface, is decoded by the 1 out of 8 decoder. The "set" line is raised by switch controller logic not shown and the connect latch is turned on. The output from the decoder is gated by the connect latch, energizing the direct out 4 line. The switch controller monitors all other connections by activating control out lines 0, 2 and 3 (FIG. 1). If, for example, channel 3 connects to interface 4, a forced disconnect occurs because the direct in 4 line is energized in response to the control out lines, and energizes the "OR" which is gated to the reset input to the connect latch.

The control out lines are also used to reserve an interface connection to a particular channel.

Logic 44 of a switch controller (FIG. 2) contains a latch for each I/O interface. Whether or not a channel can connect to a particular interface is determined by the state of the associated latch. These latches are set, sensed and reset only in response to the configuration commands.

Each channel not only has the ability to sense whether or not an interface is reserved but also to which channel it is reserved. Also, a channel can force a reset of a reserved latch in another channel when instructed to by the appropriate configuration command. This force reset is performed in a manner similar to the disconnection of an interface. When a reserve latch is reset by another channel, the channel whose latch was reset at this time, informs its CPU of this release condition by means of an interruption, or the CPU could become aware of this condition when it attempts to connect to this interface during the initiation of a new operation. A channel having its reserve latch reset while it is actually connected to an interface will respond to this condition by attempting a normal interface disconnect. If not successful because of a malfunction, a more stringent means will be used by the requested channel to force a disconnection. The requesting channel will, when it is instructed by its CPU, force a direct crosspoint disconnect as a last resort if the channel does not respond.

Dynamic sharing, that is, sharing I/O control units with one or more channels on a dynamic basis without intervention by the channel is accomplished by the switch controller with either a configuration control unit or manual switches for setting up the switch connections.

The selection logic 34 of each switch controller (FIG. 2) associated with a channel interface is designed to monitor for selection or polling sequences initiated from the channel as described in the Beausoleil et al. U.S. Pat. No. 3,336,582. The selection logic 34 responds to a selection sequence by gating the address on bus out via AND 40 and OR circuit 42 to the interface status and control latches 44. The logic 44 selects the interface specified by the address and the interface node remains busy until the channel is available for further operations. A subsequent polling or selection sequence to another address by the channel will free the node.

A selection sequence to an addressed node which is in the unavailable state will result in "select in" being returned to the channel. If the interface is busy to another channel, the switch control unit returns a control unit busy status (short sequence) to the channel that initiated the selection sequence.

The selection logic 34 responds to a polling sequence from the interface 32 by polling the highest priority nonbusy interface having a request for service, i.e., the output of logic 36. If no requests are outstanding, a select in is returned to the channel.

A synchronous status (device end, attention, etc.) can be polled by a channel if the corresponding node is not busy. The switch controller remains connected to an interface if a request remains outstanding and the channel does not poll.

The configuration states which the switch controller uses to control the node and to make responses to the channel are established by the manual switches 50 or the configuration control unit 14. The configuration control unit (FIG. 3) establishes the configuration states and provides information to the channel via the I/O interface as to the status of the switch matrix. The configuration control unit includes means for testing, setting, and resetting the configuration of the switch matrix as well as means for controlling the configurability of the attached channels.

The channel communicates with the configuration control unit just as it does with any other control unit on the interface. The configuration control unit may be attached directly to the I/O interface on the channel side of the switch matrix (see FIG. 1) or it may be attached to a pseudointerface on the control unit side of the switch matrix (see FIG. 2).

The configuration control unit operates in response to commands received from the channel via the interface 60. These commands are gated by the AND circuit 66 to the command decoder and register 74. They include basic commands, configuration commands, sensing commands, and authorization commands. The commands decoded by the command decoder 74 are transmitted to the switch controller (FIG. 2) where the interface status and control latches 44 carry out the command by energizing appropriate node drivers 46. The configuration control unit returns status information as to the state of the switch matrix 10 by means of the states received by the sense and status generator and register logic 76 from the switch controller. In response to a request from the channel for this sense data, the selection logic and sequence control 62 gates the appropriate information to bus in via AND circuit 82.

5. CONFIGURATION CONTROL UNIT

The configuration control unit 14, shown in FIG. 3, provides a means for communication between the operating system and the interface switching unit. The configuration control unit has facilities for testing, setting and resetting the configuration of the interface switching unit, as well as establishing which ones of the attached channels are authorized to perform configuration control of the switching unit.

The configuration control unit attaches to the system by means of the I/O interface or a pseudointerface (selected through the switch controller) and all communication between the configuration control unit and the channel proceeds as with any other control unit on the interface.

5.1 ADDRESSING

The configuration control unit is assigned a contiguous set of addresses (unit address logic 70) on the I/O interface equal to the number of interfaces attachable to the interface switching unit. Thus, for a 4×8 switching unit (i.e., one which switches four channels among eight interfaces or control unit strings), the configuration control unit would require eight addresses. Each address is uniquely associated with an interface such that the first address is related to interface 0, the second is related to interface 1, etc. Commands sent to the configuration control unit which do not pertain to a single interface (such as authorization commands), may be sent to any of the addresses.

5.2 OPERATIONS

All operations provided by the configuration control unit are in response to commands it receives by means of bus out on the I/O interface. These commands can be separated into four groups: basic commands, configuration commands, sensing commands, and authorization commands. These commands are gated to the command decoder 74 via AND 66. Their assignments are as follows:

| Command code P 0123 4567 | Command |
|---|---|
| | Basic: |
| 1 0000 0000 | Test I/O. |
| 1 0000 0011 | No Operation Control. |
| 0 0000 0100 | Basic Sense. |
| | Configuration: |
| 0 0010 0011 | Configure Exclusively. |
| 1 0110 0011 | Configure and Share. |
| 0 1110 0011 | Reset and Configure. |
| 1 1010 0011 | Disconnect and Suspend. |
| 1 1100 0011 | Unconfigure. |
| | Sensing: |
| 1 1000 0100 | Sense Authorization States. |
| 1 0100 0100 | Sense Entire Configuration. |
| 1 0010 0100 | Sense Channel Configuration. |
| 0 1000 0011 | Authorization: Set Authorization Register. |

Operations to be executed by the configuration control unit are initiated in the CPU by use of a START I/O instruction.

5.3 CONFIGURATION STATES

The configuration states of the paths in a switching unit are specified both in terms of node states and interface states. The state of a node signalled by means of the control portion of the switch matrix 10 (see FIG. 2) defines the relationship between a particular interface and a particular channel. The state of an interface is a summary of the collective states of the nodes associated with the interface. The states of the nodes are explicitly established by the configuration control unit by any of the following means:

1. A configuration command executed by the configuration control unit.
2. Manual configuration controls.
3. An unconditional configuration command executed by another configuration control unit on the interface switching unit.
4. A master system reset. (See Reset Out, Section 9.1.1).

The states are tested by the switch controller interface status logic 44 to determine the action to be taken in response to I/O instructions, configuration commands and interface service requests. The state information is further made available to the program by means of sense commands executed by the configuration control unit.

5.3.1 Exclusive Configuration State

An interface is said to be exclusively configured when one of its nodes is exclusively configured to a channel. An interface can thus, by definition, be exclusively configured to one and only one channel. When so configured, any request for service from any device on the interface will be directed only to the channel to which the interface is configured. Conversely, the devices on the interface are not available to any channel other than the one to which the interface is exclusively configured.

5.3.2 Shared Configuration State

An interface is said to be in the Shared Configuration state when one or more of its nodes is in the Shared Configuration state. A node is in the Shared Configuration state when the associated interface is sharable with another channel. This configuration allows devices to operate with more than one channel without requiring the execution of intervening configuration commands. (See Section 8.).

5.3.3 Suspended Configuration State

An interface in the Suspended Configuration state, although exclusively configured to a single channel, is prevented from communicating with the channel. All service requests from devices on the interface are held pending and are not directed to the channel. Similarly, attempts by any channel to communicate with devices on the interface will be unsuccessful. System Reset is not performed on this interface unless the channel to which the interface is suspended is performing the System Reset.

5.3.4 Unconfigured State

An interface having none of its nodes configured (exclusively, shared or suspended) is in the Unconfigured state as is each of the nodes. The devices on the interface are not available to any channel. A constant general reset is indicated to all the control units on this interface.

5.4 BASIC COMMANDS

Since the configuration control unit is a normal control unit insofar as its I/O interface attachment is concerned, the configuration control unit can execute the basic commands by means of command decoder 74 (FIG. 3). The commands are the No-Operation Control command, the Test I/O command and the Basic Sense command.

5.4.1 No-Operation Control

The No-Operation Control command is executed by the configuration control unit without regard for the state of the addressed interface or node or for the authorization state of the channel. It is an immediate command with Channel End and Device End presented during the initial selection sequence.

5.4.2 Test I/O

The Test I/O command serves the dual purpose of clearing pending status and testing the state of a node. When status is being held for the addressed device (node), that status will be presented to Test I/O. If primary status is being held for a device other than the one addressed, the configuration control unit will respond with the short, control-unit-busy sequence. If no status is pending, or if secondary status is pending for a device other than the one addressed, Test I/O causes the configuration state of the addressed node to be tested. If the node is configured (either exclusively, shared or suspended) the configuration control unit responds with zero status. If the node is not configured, the configuration control unit will respond with the Unit Check status.

5.4.3 Sense (Basic)

The Basic Sense command causes sense data to be transferred. The configuration control unit will force burst mode during this data transfer, sending a status byte with Channel End and Device End set at the conclusion of the transfer.

The sense data provides information concerning the state of the addressed node and detailing the reasons for the Unit Check previously presented. The bits are defined as follows:

Byte 0

| Bit | Definition |
|---|---|
| 0 | Command Reject.[1] |
| 1 | Intervention Required.[1] |
| 2 | Bus Out Check.[1] |
| 3 | Equipment Check.[1] |
| 4 | (2). |
| 5 | (2). |
| 6 | Configuration Violation. |
| 7 | Authorization Violation. |

[1] Cause Unit Check to be set.
[2] Reserved for future use.

Byte 1

| Bit | Definition |
|---|---|
| 0 | Exclusive State. |
| 1 | Shared State. |
| 2 | Suspended State. |
| 3 | Unconfigured State. |
| 4 | (1). |
| 5 | (1). |
| 6 | (1). |
| 7 | (1). |

[1] Reserved for future use.

Command Reject:

This sense bit will be set if a command is sent to the configuration control unit which is not defined for the configuration control unit or which requires a feature not currently installed on the configuration control unit. The status byte contains a Unit Check only and is presented during the initial selection sequence which caused the command to be rejected. The states of all nodes and all authorization states remain unchanged.

Intervention Required:

This bit will be set if a manual configuration switch prevents the successful execution of a configuration or authorization command.

Bus Out Check:

This bit is set if invalid parity is detected on Bus Out during the transfer of a command to the configuration control unit, or if an invalid interface sequence is detected by the configuration control unit. The status byte contains Unit Check only if presented during the initial selection sequence during which the error was detected, and contain Unit Check, Channel End and Device End if an invalid sequence is detected after the initial selection sequence occurs.

Equipment Check:

This bit is set if an equipment malfunction is detected during the execution of a command by the configuration control unit. The success of the command is therefore questionable.

Any of the following conditions can cause the Equipment Check bit to be set:

During execution of a configuration command, the configuration control unit detected the failure of a node to assume the state to which it was set.

During execution of a configuration command which forces reconfiguration (see configuration commands), the configuration control unit was unable to force the interface to unconfigure from another interface.

During execution of the authorization command, the configuration control unit detected the failure of an authorization indicator to assume the state to which it was set.

The status byte terminating the command during which the malfunction was detected will contain Channel End, Device End and Unit Check only.

Configuration Violation:

This bit is set if Configure Exclusive command is issued to an interface that is already configured to another channel or a Configure And Share command is issued to an interface, that is, configured exclusively or suspended to another channel. The presence of this bit causes Unit Check to be presented.

Authorization Violation:

This bit is set if configuration or authorization command is issued by a channel whose authorization bit is not on or Configure Out is not up when the command is issued. The presence of this bit causes Unit Check to be presented.

Exclusive State:

This bit is set if the interface associated with the addressed node is exclusively configured to one of the channels.

Shared State:

This bit is set if the addressed node is in the Shared Configuration state.

Suspended State:

This bit is set if the addressed node is in the Suspended Configuration state.

Unconfigured State:

This bit is set if the interface associated with the addressed node is not configured to any channel including the Suspended Configuration state.

5.5 CONFIGURATION COMMANDS

Several commands are defined to change the state of a node. The commands can be grouped into three categories. The first category includes those commands which request a configuration state to be set. These commands will be successful whenever the requested configuration does not conflict with the configuration states of other nodes on the interface. The second category includes those commands which force a configuration state to be set regardless of the states of the other nodes on the interface. The third category includes a command which is unrelated to the other nodes on the interface.

All configuration commands are immediate, and, if executed, will cause Channel End and Device End to be sent during the initial selection sequence. If the execution was unsuccessful or of questionable success, Unit Check will also be included in the status byte with appropriate sense indicators set.

A configuration command can only be executed if the configuration control unit is authorized to change configuration states. (See authorization command and Configure Out, Section 9.1.4). If the configuration control unit is not so authorized, any configuration command will be rejected by presenting Unit Check along during the initial selection sequence and by setting the Authorization Violation sense bit.

5.5.1 Configure Exclusively

The addressed node is set to the Exclusive Configuration state if all other nodes on the interface are in the Unconfigured state.

If the interface was already configured to another channel, (another node on the interface was in the Exclusive or Suspended Configuration state or one or more of the other nodes were in the Shared Configuration state), initial status will include Unit Check with the Configuration Violation Sense bit being also set.

5.5.2 Configure and Share

The addressed node is set to the Shared Configuration state if no other nodes on the interface are in the Exclusive or Suspended Configuration state.

If another node on the interface was already in the Exclusive or Suspended Configuration state, the initial status will include Unit Check with the Configuration Violation Sense bit being also set.

5.5.3 Reset and Configure

The interface associated with the addressed node is unconditionally reset and the addressed node is set to the Exclusive Configuration state.

If the interface was in the Unconfigured state, no other channel or node is affected by the execution of the command and the same result could have been achieved by Configure Exclusively. If the interface was in the Exclusive, Shared or Suspended Configuration, all configured nodes (including the addressed node if configured), are changed to the Unconfigured state (thus resetting the interface) before the addressed node is set to the Exclusive Configuration state. If an operation is in progress with a device on the interface at the time the command is executed, a malfunction condition or "-hand" condition may be encountered by the associated channel or subchannel.

Since the states of other nodes on the interface do not preclude the execution of this command, its execution can be unsuccessful only if an equipment malfunction is encountered. This will be indicated by including Unit Check in the initial status and by setting the Equipment Check sense bit.

If a program issues a Reset and Configure command to an interface switch unit, thus resetting all devices on an interface, it is the responsibility of the program to clear the associated unit control words with a CLEAR SUBCHANNEL instruction. If channels have a common shared unit control word storage this is necessary in order to clear these subchannels when devices are reset.

5.5.4 Disconnect and Suspend

The interface associated with the addressed node is placed in the Suspended Configuration state. If a burst operation is in progress, an interface disconnect sequence is attempted.

The Interface Disconnect is attempted by the configuration control unit associated with the channel connected to the interface on request by the configuration control unit executing the command.

The states of all nodes on the interface except the addressed node are set to the Unconfigured state. If an operation is in progress with a device on the interface at the time the command is executed, a malfunction condition or "hand" condition may be encountered by the associated channel or subchannel.

Since the states of the other nodes on the interface do not preclude the execution of this command, its execution can be unsuccessful only if an equipment malfunction is encountered. This will be indicated by including a Unit Check in the initial status and by setting the Equipment Check sense bit.

5.5.5 Unconfigure

The addressed node, if it is not in the Dedicated state (see Section 6.2.2), is set to the Unconfigured state. The states of the other nodes on the interface are not affected nor is any operation affected which is in progress on another channel with a device on the interface.

Since the states of the other nodes on the interface do not preclude the execution of this command, its execution can be unsuccessful only if an equipment malfunction is encountered. This will be indicated by including a Unit Check in the initial status and by setting the Equipment Check sense bit.

5.6 SENSING COMMANDS

The sensing commands cause information relative to the states of the nodes to be passed to the channel.

5.6.1 Sense Authorization States

Sense Authorization States command provides information concerning the channel authorization register. Bit 0 of sense data byte 0, if "on," indicates that channel 0 is allowed to execute configuration and authorization commands; bit 1, byte 0, if "on," indicates that channel 1, etc.

5.6.2 Sense Entire Configuration

Sense Entire Configuration command provides information indicating the entire configuration of the interface switching unit. Bit 0, of sense data byte 0, if "on," indicates that interface 0 is configured to channel 0. Bit 1, byte 0, if "on," indicates interface 1 is configured to channel 0, ...., bit 7, of sense data byte 1, if "on," indicates interface 15 is configured to channel 0. Bit 0, of sense interface 15 is configured to channel 0. Bit 0, of sense data byte 2, if "on," indicates that interface 0 is configured to channel 1. Bit 1, of sense data byte 2, if "on," indicates that interface 1 is configured to channel 1, etc.

A Sense Interface Configuration command, would for example, be issued in response to an indication that an unconditional configuration command was executed by another configuration control unit on the interface switching unit (see Attention, Section 5.9.1).

5.6.3 Sense Channel Configuration

Sense Channel Configuration provides information indicating which interface paths are configured to the channel issuing the command.

The data byte returned indicates the configuration state of each interface. For example, bit 0, byte 0, if "on," would indicate that interface 0 is configured to the channel issuing the command; bit 1, byte 0, if "on," would indicate that interface 1 is configured to the channel issuing the command, etc.

5.7 AUTHORIZATION STATES

An authorization state is associated with each configuration control unit. The Authorization state is indicated by an authorization register or by manual AUTHORIZATION CONTROL switches. The authorization register is set by authorization commands or during system or master system reset according to a manually predetermined state.

The Authorization state allows configuration and authorization commands to be executed. It is also to be noted that the down state of the Configure Out line can also prevent these commands from being executed (see Section 5.5).

5.8 SET AUTHORIZATION REGISTER

Set Channel Authorization Register: The channel authorization register is selected and set according to the bits in the control-order code. Bits 0, 1, 2, etc., specify channel 0, 1, 2, etc.

If a bit identified with a particular channel is "on" the configuration and authorization commands are allowed to be executed by the associated channel configuration control unit. If this bit is not "on" the command will be unsuccessful. This will be indicated by including a Unit Check in the initial status and by setting the Authorization Violation Sense bit.

5.9 STATUS

The following status bits are used by the configuration control unit:

| Bit position | Description |
|---|---|
| 0 | Attention. |
| 1 | Status Modifier. |
| 2 | Control Unit End. |
| 3 | Busy. |
| 4 | Channel End. |
| 5 | Device End. |
| 6 | Unit Check. |
| 7 | Unit Exception. |

Note.—Status may also be generated by the switch controller (see Section 6).

5.9.1 Attention

The Attention status bit is used only along with the Unit Check status bit to indicate an asynchronously occurring abnormal condition (See Unit Check). Attention and Unit Check can be presented either in an asynchronous status sequence or in response to a Test I/O. Attention, Unit Check and Busy will be presented if a non-Test I/O command is received for a device subsequent to the generation of the Attention and Unit Check but prior to the status having been accepted by the channel. Attention will never be presented with status bits other than Unit Check along or Unit Check with Busy.

5.9.2 Status Modifier

The status Modifier bit is used only along with the Busy bit to indicate a control-unit-busy condition. The control-unit-busy condition is indicated only when the configuration control unit is holding primary status (i.e., Channel End, Device End status), for a device other than the one addressed and is always presented by means of the short, control-unit-busy sequence. Status Modifier will never be presented with status bits other than Busy.

5.9.3 Control Unit End

The Control Unit End status bit is used to indicate that a previously indicated control-unit-busy condition no longer exists. Control Unit End may be presented alone, in an asynchronous status sequence, in response to Test I/O, or along with Busy in response to a non-Test I/O command. Control Unit End can occur with no other status bits except Busy.

5.9.4 Busy

Busy indicates either that the addressed device has pending status or, with Status Modifier, that the configuration control unit is busy (See Status Modifier). Busy is presented with any other status bits which are pending for a device addressed with a non-Test I/O command. Busy can be presented either as Control Unit Busy or Device Busy only in response to an initial selection sequence and in all cases indicates that the command was not executed or even inspected.

5.9.5 Channel End

Channel End is always presented with Device End to indicate completion of the execution of a command. Channel End and Device End never occur separately. Unit Check will accompany Channel End and Device End if the command was abnormally executed. Busy may additionally occur if the device is addressed by a non-Test I/O command prior to the acceptance of Channel End and Device End (and, if generated, Unit Check) by the channel.

5.9.6 Device End

See Channel End.

5.9.7 Unit Check

Unit Check is presented to indicate the existence of an abnormal condition. Unit Check is presented alone only in response to an initial selection sequence and indicates that the command received could not be executed. The bits in the sense byte described the abnormal condition. Unit Check, when presented with Channel End and Device End, indicates that an abnormal condition was detected during the execution of the command. Unit Check is presented with Attention to indicate an asynchronously occurring abnormal condition. Busy may occur with any of the above status combinations, (see Busy).

5.9.8 Unit Exception

Available for definition.

5.10 INTERFACE SEQUENCES 5.10.1 System Reset

A system reset received by the configuration control unit will cause any pending status, status conditions or operations in progress in the configuration control unit to be reset. The reset will not affect in any way the configuration state of any node nor the authorization state of this or another configuration control unit.

5.10.2 Selective Reset

The configuration control unit response to a selective or malfunction reset is identical to that for a general reset.

5.10.3 Interface Disconnect

An Interface Disconnect sequence will cause the configuration control unit to immediately drop Operational In and thus all other interface lines. If the Interface Disconnect is received subsequent to zero initial status for a non-Test I/O command but prior to end status, the data transfer will additionally be terminated, Channel End and Device End will be generated, and Request In raised to request presentation of end status. An interface disconnect sequence received at any other time has no effect.

6. SWITCH CONTROLLER

The switch controller, FIG. 2, by monitoring the I/O interface, the channels 30 and the configuration states, (via control portion of switch matrix 10) is able to control the nodes (Bus portion of the switch matrix 10) and also provide any necessary interface responses. The switch controller establishes temporary states for the nodes as a result of the monitored activity on the interface lines and makes this information available, by means of the configuration control unit 14, to the operating system. The control by the switch controller is supplied such that neither the channel 30 nor the control units 20 need be aware of the intervention of the switch controller.

6.1 INTERFACE ADDRESSING

The particular I/O interface addressed by a channel during an initial selection sequence (see above-mentioned Beausoleil et al. U.S. Pat. No. 3,336,582) is determined by the switch controller by examining the address on Bus Out gated via AND 40 from the channel. A portion of all addresses is allocated to identifying the interfaces. This portion may be the high-order bit or bits of the unit-address byte. It may be the second address byte where two-byte I/O addressing is available on a channel but not on any control units/devices attached. It may be the high-order bit or bits of the second address byte where both the channel and control units/devices use two-byte addressing.

The actual bit combination to be used is established at the time the interface switching unit is installed or whenever the component configuration of the installation is changed. (This may be accomplished, for example, by the use of manual switches, pluggable jumpers or cards, etc.)

Consider a 2×4 interface switching unit, (i.e., two channels and four I/O interfaces), all nodes in the configured and shared state and single-byte addressing. It would, in this case, be adequate to allocate the high-order two bits of the eight unit-address bits for interface selection. The six remaining bits allow 64 device addresses per interface. (Note that if each of the two configuration control units are assigned the same group of four addresses, one interface can have only 60 addresses for devices on that interface.)

6.2 OPERATING STATES

The monitoring of the operations at the nodes of the interface switching unit via the control portion of switch matrix 10 (FIG. 2) involves the establishment of certain operating states of the node and thus, also, the interface. These states indicate the status of the connection and are used for proper routing of control-unit-initiated sequences and for determining the connectability of other channels to the interface.

6.2.1 Connected State

When a channel is actively communicating with a control unit; i.e., the control unit has the Status In or Operational In line up or when Select Out from the channel is up on the interface, or during the time from presentation of Device End to the reselection of the chain command, the node is said to be in the Connected state. While the node, and thus the interface, is in the Connected state, no other channel can become connected to the interface.

A channel, therefore, can only be connected to one interface at a time and an interface can only be connected to one channel at a time.

6.2.2 Dedicated State

When the interface switching unit is used in such a way that operations (including a chain of operations) must go to completion with the channel which initiated the operation, the associated node is in the Dedicated state. When in the Dedicated state, all control unit-initiated sequences are sent to the channel to which the interface is dedicated.

An interface can be dedicated only to one channel at a time; however, a channel may have more than one interface dedicated to it.

When the interface switching unit is used with the selector channels of a single system, the nodes for that channel do not need the Dedicated state since the Connected state serves the same function. Similarly, when the interface switching unit is used on a system which permits its channels to share unit control words, the Connected state is adequate. In all other cases, a Dedicated state is necessary.

The duration of the Dedicated state can vary depending on the system to which the interface switching unit is attached. If two systems are attached (implying that control blocks are not shared), the Dedicated state must encompass not only the chain of operations but also any required error recovery. When the interface switching unit is used with multiple central processing units (CPUs) which share appropriate control blocks, it is sufficient to maintain the Dedicated state only until the final status of the operation (or chain of operations) is accepted by the channel.

6.3 INITIAL SELECTION SEQUENCE

When Address Out and then Select Out are raised by the channel 30, Selection Logic 34 initiates a selection sequence gating the address on Bus Out via AND 40 and OR 42 to the logic 44. The logic 44 examines the address on Bus Out and selects the appropriate node drivers 46. If the node is not configured to the channel or is in the Suspended state, the selection logic 34 causes Select Out to be sent back to the channel as Select In and no interface selection sequence takes place. If the node is configured exclusively to the channel or is configured and sharable and the interface is not busy with another channel, the node is set to the Connected state and the selection sequence is permitted to be executed normally on the addressed interface. If the node is configured and sharable but the interface is busy with another channel, the switch controller signals a control-unit-busy sequence to the channel and the interface selection sequence does not take place.

6.4 CONTROL UNIT END

If a control-unit-busy sequence was returned by the switch control unit in response to an initial sequence, subsequent Control Unit End status is normally submitted when the interface is no longer busy. The I/O address accompanying the Control Unit End is the I/O interface path address.

If Control Unit End is pending at the configuration control unit 14 at the time the channel attempts to address a device on the associated interface, the configuration control unit will return the Control Unit End status bit along with the Status Modifier and the Busy bit (short control-unit-busy sequence).

6.5 INTERFACE POLLING SEQUENCE

The I/O interface sequence used by channels to handle data and service requests is referred to as a polling sequence. This sequence is used by some channels largely as a response to Request In while other channels poll whenever no other activity is taking place in the channel.

A polling sequence detected by the selection logic 34 causes the Request In lines on the nodes pertaining to the channel gated via AND 38 and OR 42 to logic 44 to be examined. The polling sequence proceeds to the highest priority interface which has its Request In line up and which is either configured exclusively to the channel or which is configured and shared and not busy with another channel. Each interface, while it is being polled is considered busy (if not already so) and the corresponding node state in the control section of the switch matrix 10 is set (if not already set). If no Request In line is up on any interface configured to the channel or which is configured and shared and not busy with the channel, Select In is returned by the selection logic 34 (indicating no request currently requiring service).

6.6 CONTROL UNIT INITIATED SEQUENCE

When a control unit 20 is in need of data or status servicing it causes Request In to be raised on the interface. The switch controller logic 36 monitors the Request In line for all interfaces to which it is configured exclusively or configured and shared (and not busy with another channel). If such a signal is detected when the channel is not busy, the Request In is sent to the channel. When Select Out is raised in response, and if the interface has not become busy with another channel, the node is set to the Busy state and the polling sequence continues normally. If the interface became busy with another channel, the Request In signal is removed and the polling sequence is not permitted to affect the interface.

7. SWITCHING MATRIX

The switching matrix 10, FIG. 1, is made up of transistor crosspoints (FIG. 4) which are designed to be used with a standard I/O interface of the type described in the above-mentioned Beausoleil et al. U.S. Pat. No. 3,336,582. The switch matrix accommodates the I/O interface lines plus additional lines (control out, direct out, and direct in) which together are used to coordinate dynamic, electronic reconfiguration of the system.

Because the crosspoint switch occupies a central position in the system, reliability and availability are prime considerations. To meet this, the crosspoint avoids the use of a local power supply. Power is supplied indirectly to each crosspoint by the channel controlling that crosspoint and by the natural power levels of the signals on the I/O interface propagating through the crosspoint.

Figure 4:
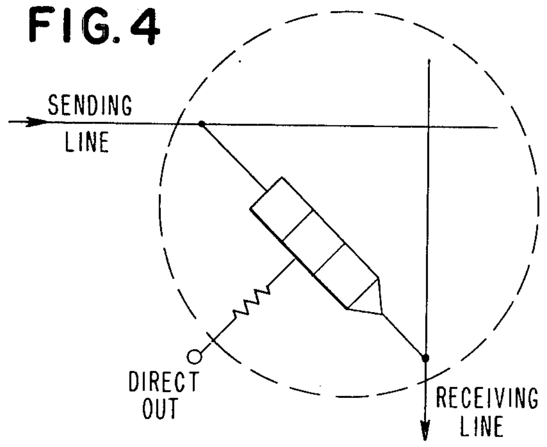
FIG. 4 is a schematic of the crosspoint switch used in the switch matrix 10 of FIGS. 1 and 2.

The crosspoint is shown in FIG. 4. A crosspoint is turned on or initialized for conduction by saturating the transistor through its' base resistor. This is accomplished by raising the signal line "direct out" which is supplied to the switch matrix from the switch controller. Data signals on the I/O interface "-sending line" arriving at the collector of a selected crosspoint are propagated to the emitter attenuated by the saturation drop of the transistor.

Figure 5:
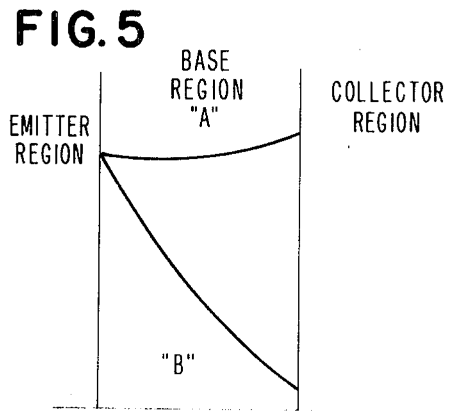
FIG. 5 is a chart of the base-charge distribution of the transistor of FIG. 4.

The propagational delay through an individual crosspoint is determined by the majority carrier relaxation time illustrated in FIG. 5. The base charge distribution of a saturated crosspoint transistor that is not propagating a signal initially assumes profile A. Upon the arrival of a signal at the collector, the base charge recovers or relaxes, into profile B. During the transition period, the base region is analogous to a three dimensional resistor-capacitor network, the time constant of which is measured in picoseconds. In a model tested, equipment with a resolution of 400 picoseconds, was unable to measure it. Propagational delay through the crosspoint switch is therefore that of wiring and cabling which might be approximately 9 nanoseconds.

The time necessary to initialize a crosspoint for conduction or to disconnect a crosspoint from conduction is primarily determined by carrier lifetime in the base region. This delay may be in the order of less than 35 nanoseconds.

The minimum voltage amplitude of the direct out signal to the crosspoint base is the maximum current necessary to maintain the crosspoint transistor in saturation during the propagation of a minimum level I/O interface signal on the sending line. The maximum level of the direct out drive is the amount of allowable level shift on the interface lines due to base current. Typical values would be 150 millivolts, or approximately 3 milliamperes of base current.

Figures 6, 7, 8:
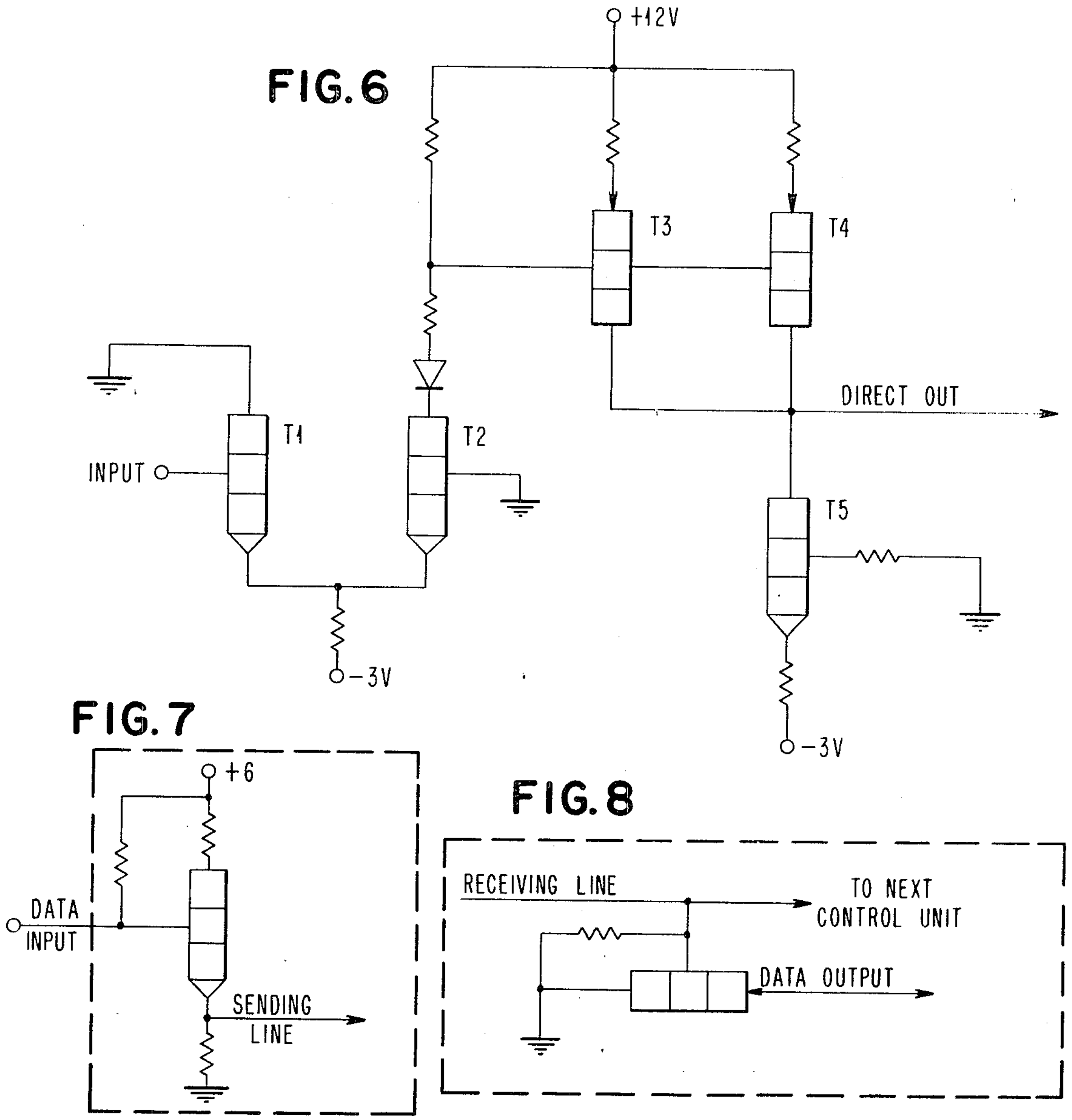
FIG. 6 is a schematic diagram of a drive circuit for driving the direct out line of the crosspoint of FIG. 4.
FIG. 7 is a schematic diagram of a circuit for driving the send line of the crosspoint of FIG. 4.
FIG. 8 is a schematic diagram of a circuit for driving the receive line of the crosspoint of FIG. 4.

A suitable direct out driver (FIG. 6) is designed to use a 12-volt power supply. Assume that a 3.6K ohm resistor provides base isolation on the crosspoint switch of FIG. 4. This resistance in combination with the previous criteria results in amplitudes between 9.97 volts and 12.08 volts on the direct out drive line at the crosspoint. The circuit uses PNP transistors T3 and T4 in the output stage in order to take full advantage of the drive tolerance range and to provide short circuit protection to the drive circuit. When a direct out driven is on, T3 and T4 are saturated. When overloaded, the transistors become unsaturated and current limited by the emitter series resistors. The NPN transistor T5 in the output circuit provides a slight negative down-level when the direct out driver is off, which tends to minimize the data-path to data-path crosstalk through nonselected crosspoints. The emitter series resistor (for example, 200 ohm) serves to limit the driving NPN collector power dissipation. The driver has an output impedance of approximately 11 ohms and rise and fall times of less than 100 nanoseconds.

8. INTERFACE SWITCHING UNIT VERSIONS

While the preceding has described a complete interface switching unit definition which addresses most known needs, it is recognized that most applications do not require the full capability which is possible. For these situations, subsets of the full definition can be identified which provide upward compatible and modular switch implementations. Several of these are now described. For each version, the objectives and specific requirements of the implementation are first outlined followed by a description of its operation.

8.1 MULTIPLE INTERFACES PER CHANNEL

The electrical specifications of the I/O interface may restrict the total resistance available for control units and cables. The result is that long cable lengths are possible only if few control units are attached and many control units can be attached only if short cables are used. It is frequently desirable to have both long cables and many control units, however.

A switching unit is thus needed to satisfy the following requirements.

The switching unit must be capable of attaching multiple interfaces to a single channel in a manner which is transparent to the channel, the control unit and the program.

The switching unit must be capable of operating with either selector and multiplexor channels and burst- or multiplex-mode control units.

The interface switching unit is comprised of a switch controller and a switching matrix. A configuration control unit is not needed since the configuration is static. The switch controller complexity is furthermore reduced for this version since only one channel is involved and the configuration states are constant. The switching matrix reduces to a trivial case.

An initial selection sequence by the channel causes the interfaces to be sequentially selected while Address Out and Bus Out are sent in parallel or sequentially to all interfaces. If Select In is returned by an interface, (indicating that the addressed device is not attached to the interface), Select Out is gated to the next interface until a device or control unit responds or until all interfaces have been selected.

A control unit or device request for service causes the channel to initiate a polling sequence. The switch controller selects for polling that interface which is requesting service. If none is requesting service, Select In is immediately returned to the channel.

All resets, general and malfunction, are sent in parallel to all interfaces. The resets perform the same function as currently defined and do not affect the states of the interface switching unit.

8.2 EXTENDED DEVICE ADDRESSING

The number of devices per channel is currently limited to 256 by virtue of the single-byte address used on the interface. The ability to use an additional byte has been defined for the channels but is not currently implemented by any control unit.

A switching unit fulfilling the following requirements can fill this need:

The switching unit must be capable of attaching multiple interfaces to a single channel in a manner which is transparent to the control unit, channel and the program.

The switching unit must be capable of operating with either selector or multiplex-mode control units.

The switching unit must be capable of selecting the individual control units by means of an additional address byte supplied by the channel.

Furthermore, whenever a device provides its address to the channel, the switching unit must augment the address with the appropriate additional address byte.

As can be seen by the requirements, the switching unit to satisfy this need is an extension of the first version described in Section 8.1. In addition to the capabilities there described, the ability to handle an additional address byte is required both in the interface switching unit and in the channel.

An initial selection sequence will involve the sending by the channel of a two-byte address to the switch controller. The second byte will address the interface to which the device is attached and the first byte identifies the device. The switch controller thus selects the addressed interface and the initial selection proceeds. If select In is returned from the selected interface, no other interface is selected and Select In is returned to the channel. The switch controller must assure that the additional byte of address is supplied on Bus In with proper Mark and Mark Parity at the proper time. (See Section 6)

When a device or control unit indicates a request for service and the channel responds with a polling sequence, the switch controller causes only the requesting interfaces to be selected. Again, when address information is sent to the channel by the control unit or the device, the switch controller augments the address with the additional address byte associated with the interface.

8.3 MANUAL STEADY STATE

It is sufficient in many switching situations, to have a means for manually configuring a system when the system is stopped. The same effect can be achieved (and is, in some cases) by changing the interface cables to get the desired combination of components.

8.4 MANUALLY CONTROLLED CONFIGURATION

When a switching environment does not demand programmed switching and where stopping the system for switching is not acceptable, a manually controlled switching unit with a logically determined switching time is utilized. Such a switch is manually activated but is effective only when logic which monitors the interface activity determines that switching can be accomplished without interface errors. The switch is used in conjunction with programming and the operator(s) to the extend that activity on the interface has ceased before the manual-switching is performed.

The manually controlled logical switch must fulfill the following requirements:

The switching must provide a means for connecting any attached interface to any attached channel as directed by manual switches.

The switching unit must delay the actual disconnection and connection of the interface and channels until a point in the interface activity has been reached which permits switching without interface errors.

The switching unit must be capable of operating with either selector or multiplex or channels and with either burst- or multiplex-mode control units.

Once switching has been accomplished, the existence of the switching unit must be transparent to the channel and the control units.

The interface switching unit which satisfies this requirement is composed of a switching matrix and a simplified switch controller. Since no programmed control over switching is required, the configuration control unit is not needed. The configuration state of each node is indirectly specified by the setting of the manual switch pertaining to that node; the configuration state being different from the switch setting only during the logically determined delay in configuration.

When a manual configuration switch is changed, the switch controller examines the operating state of the node associated with the interface. If the node is in the Connected or Dedicated state, the reconfiguration indicated by the manual switch is suspended. When the node is no longer in the Connected or Dedicated state, the interface is switched, and thus becomes exclusively configured to the channel indicated by the manual switch. The reconfiguration to the new channel can usually be done without regard to the activity on the new channel, but must, nonetheless, be done without causing interface errors on the new channel.

8.5 MANUALLY CONTROLLED SHARING

Most situations which require that devices (control units) be shared between channels have minimal reconfiguration requirements which could be satisfied by a manual reconfiguration means. An interface switching unit is thus identifiable which establishes configuration by means of manual switches 50 (FIG. 2) and provides all necessary logic to allow the sharing of devices, control units and interfaces among channels.

The requirements thus include the following:

The switching unit must permit the configurability of multiple interfaces to each channel and multiple channels to each interface.

The switching unit must provide a manual switching means for establishing the overall configuration of the interfaces and channels.

A logical means must be provided which handles the sharing and the contention among the channels for the interface. The means must operate in such a way that its intervention does not introduce indications which a normal operating system cannot easily handle.

The switching unit need only provide for sharing between selector channels operating only with a common CPU. Multiplexor channels and channels shared by or connected to multiple CPUs are specifically excluded.

This switching-unit version requires a switching matrix and a switch controller. Since manual configuration is utilized, no configuration control unit is required.

The configuration states are established by the manual switches. The only possible states for a node are Shared Configuration state and Unconfigured state. As with the logically controlled configuration version of the switching unit, the manual switches do not directly establish the state of the node, but initiate a switching action that completes only as interface conditions permit (see Section 5.3.1). Note that the Exclusive Configuration state is effectively available by establishing the Shared Configuration state at only one node on the interface.

The switch controller establishes the Connected state for a node when Select Out is directed to the interface either for polling or for initial selection purposes. The node remains in the Connected state until Select Out is sent from the same channel but is not directed to that interface. For example, consider a 2×4 switch which has channels 1 and 2 and interface strings A, D, C and D attached to it. Subsequent to a master reset, channel 1 initiates a selection sequence to interface A. Upon receiving the Select Out and determining that interface A is being addressed, the switch controller sets the state of the node to the Connected state. During the operation which follows, the Connected state is maintained since, by definition of the selector channel, only one device is handled from the receipt of a START I/O until primary status is accepted by the CPU. Repeated initial selection sequences to that same device, or, in fact, any device on the interface will not cause the Connected state of the node to be reset. If, however, channel 1 should address a device on interface B, C or D, the switch controller will reset the Connected state of the node for interface 1 and set the node for the addressed interface to the Connected state. An attempt by channel 2 to address a device on an interface which has its channel 1 node in the Connected state will receive as a response, the control-unit-busy sequence.

The switch controller will raise Request In to the channel whenever any of the interfaces configured to the channel has its Request In line up or whenever one of the nodes for that channel is in the Connected state. (The latter condition will provide the needed interlock for resetting the Connected state since a selector channel will respond to the Request In with a polling sequence only after primary status has been cleared. On some channels the polling sequence occurs automatically, therefore, it is noted, raising the Request In signal is redundant).

It is apparent that no more than one node per interface and no more than one node per channel can be in the Connected state by definition of the Connected state.

Since this switching-unit implementation is restricted to channels on the same CPU, it is possible to eliminate the presentation of Control Unit End when in the Connected state causing the switch controller to indicate that control unit busy no longer exists. The reset of the Connected state is always associated with the occurrence of primary status and the presentation of that status is sufficient to reinitiate the unsuccessful START I/O.

Asynchronous status (Device End for a not ready-to-ready transition, Device End subsequent to the acceptance of an unchained Channel End, Attention, etc.) is sent to whichever channel first responds to the Request In line. If more than one channel responds, only one will be successful, the others will receive Select In back and Request In will fall for that channel.

8.6 DYNAMIC SHARING OPTION

When it is possible to have more than one multiplex channel sharing unit control word storage it is possible to implement a type of sharing that is much more dynamic than the sharing described in Section 8.5. With this type of sharing any one of the channels may handle service requests from any device and the node connection must be maintained only as long as the interface is in the Connected state (6.2.1). This type of sharing provides the greatest performance improvement and may be controlled by manual or programmed means.

9. INPUT/OUTPUT INTERFACE ADDITIONS

To fulfill the total requirements for I/O interface switching, certain functions are required of the I/O interface which are currently not supplied. Some of these functions have been suggested at various times in the past for various purposes and now, with the requirements of switching also in hand, their implementation appears justified. Others are necessary for proper switching operation.

9.1 NEW INTERFACE LINES

Three new lines are defined for the I/O interface. One line is outbound from the channel to the switching unit; two are inbound from the control unit to the switching unit and the channel.

9.1.1 Reset Out

When the system of which the switching unit is a part is configured into subsystems each with its own CPU, it is usually necessary to isolate resets to affect only the concerned components and to further provide a reset which is independent of subsystems.

For the subsystems, the currently defined system and selective resets apply as described in Sections 5.10.1 and 5.10.2.

A new, overall or Master Reset is defined which is capable of affecting the states of nodes as well as performing the system reset function. The reset is similar to the currently defined System Reset with the additional specification that the new tag line designated Reset Out must rise before the fall of Operational Out and must remain up for the same period of time as Operational Out is down.

To be effective, Reset Out must rise before Operational Out drops and must remain up until after Operational Out rises. Operational Out must stay down until Operational In falls.

The reset performed by Reset Out affects the states of the nodes (and the authorization states, if any), by setting each state according to a predetermined configuration. The reset could thus change or could have no effect upon the state of a particular node depending on whether it had or had not been set to a different state since the last Master Reset.

The reset causes the channel authorization bits to be turned on.

9.1.2 Disconnect In

The Disconnect In line is provided by a control unit to warn the channel (and the switching unit) that a condition has been detected at the control unit which requires that the control unit disconnect from the interface (e.g., power supply failure). The channel should, in response, immediately initiate steps to quiesce activity on the interface. The interface switching unit will respond by setting the configuration states for the interface to the configure and suspend state.

9.1.3 Allegiance In

A new line, designated Allegiance In, indicates to the channel (and the switching unit), that a device or control unit on the interface owes allegiance to the channel to which it is connected. The use of the line permits the channel and switching unit to determine when disabling, partitioning and switching of the interface can be permitted.

This line will be raised by a control unit when any command is received for any attached device and will remain up until ending status has been accepted. Furthermore, if an error condition exists, this line will remain up until the sense data are cleared.

9.1.4 Configure Out

Configure Out is a line from the channel to the interface switching unit and is used in conjunction with the out-tag lines to provide the following special function:

Reconfiguration is permitted when Configure Out is up (active) when Command Out is raised during the initial selection sequence. Configure Out must be up at the configuration control unit for the same duration as required for the individual bit to be valid designating the command byte on bus out.

While the invention has been particularly shown and described with reference to a preferred embodiment thereof, it will be understood by those skilled in the art that various changes in form and details may be made therein without departing from the spirit and scope of the invention.

What is claimed is:

1. A crosspoint switch matrix for connecting a plurality of sending lines to a plurality of receiving lines which lines are energizable to carry direct current DC voltage levels of a DC interlocked demand-response interface comprising:

a plurality of transistors, one of each of a pair of sending and receiving lines, each transistor having its collector connected to a sending line and its emitter connected to a receiving line, switch control means for causing a sending line to be electrically connected to a receiving line, which includes means for supplying a current to the base of the one of said plurality of transistors which is common to said sending line and said receiving line, which current is of sufficient magnitude to drive said transistor into saturation;

means for energizing said sending line with a DC signal, and means terminating said receiving line in a circuit providing a direct current return path.

2. The combination according to claim 1 wherein said switch control means is connected to said sending lines and is responsive to selection signals transmitted over said sending lines to thereby cause a sending line to be electrically connected to a receiving line in response to said selection signals.

3. A crosspoint switch matrix for connecting a first plurality of sending lines and receiving lines to a second plurality of sending and receiving lines, sending lines connecting to corresponding receiving lines and forming a pair of sending and receiving lines, said lines adapted to carry control signals, comprising:

a plurality of transistors, one for each of said pair of sending and receiving lines, each transistor having its collector connected to a sending line of said first plurality and its emitter connected to a receiving line of said second plurality, or having its collector connected to a sending line of said second plurality and its emitter connected to a receiving line of said first plurality, and switch control means connected to said sending and receiving lines of said first plurality of lines responsive to signals transmitted over said first plurality of sending and receiving lines for causing said sending and receiving lines of said first plurality of sending and receiving lines to be electrically connected to said second plurality of sending and receiving lines, which switch control means includes direct out signal means for supplying a drive signal of a first polarity to the bases of said plurality of transistors, the minimum amplitude of said first polarity drive signal being that which is sufficient to supply a maximum base current which maintains said transistor in saturation during the propagation of a minimum voltage level of control signals appearing on said sending lines.

4. The combination according to claim 3 wherein the maximum voltage amplitude of said first polarity drive signal is limited to the amount of allowable voltage shift of said control signals caused by base current in said transistor.

5. The combination according to claim 3 wherein said direct out signal means includes means for supplying a drive signal of a polarity opposite to said first polarity to said bases of said plurality of transistors and of an amplitude sufficient to minimize crosstalk between pairs of sending and receiving lines through nonenergized crosspoints.

6. The combination according to claim 4 wherein said direct out signal means includes means for supplying a drive signal of a polarity opposite to said first polarity to said bases of said plurality of transistors and of an amplitude sufficient to minimize crosstalk between pairs of sending and receiving lines through nonenergized crosspoints.

7. Switching apparatus for switchably connecting a first group of control lines connected to a controlling module to one of a plurality of controlled modules, having a second group of control lines connected thereto, said control lines including sending lines energizable by signal sources at said modules and receiving lines for receiving control signals sent on corresponding sending lines, each sending and receiving line of said first group paired with receiving and sending lines respectively of said second group comprising:

a plurality of transistors, one for each of a pair of sending and receiving lines, each transistor having its collector connected to a sending line and its emitter connected to a receiving line, and switch control means associated with said controlling module for causing sending and receiving lines in said first group to be electrically connected to selected receiving and sending lines in said second group of said one of said controlled modules, which control means includes direct out signal means for supplying a drive signal of a first polarity to the bases of a plurality of transistors of said selected lines; the minimum amplitude of said first polarity drive signal being that which is sufficient to supply a maximum base current which maintains said transistor in saturation during the propagation of a minimum voltage level of control signals appearing on said sending lines.

8. The combination according to claim 7 wherein the maximum voltage amplitude of said first polarity drive signal is limited to the amount of allowable voltage shift of said control signals caused by base current in said transistor.

9. The combination according to claim 7 wherein said direct out signal means includes means for supplying a drive signal of a polarity opposite to said first polarity to said bases of said plurality of transistors and of an amplitude sufficient to minimize crosstalk between pairs of sending and receiving lines through nonenergized crosspoints.

10. The combination according to claim 8 wherein said direct out signal means includes means for supplying a drive signal of a polarity opposite to said first polarity to said bases of said plurality of transistors and of an amplitude sufficient to minimize crosstalk between pairs of sending and receiving lines through nonenergized crosspoints.

PO-1050
(5/69)

UNITED STATES PATENT OFFICE
CERTIFICATE OF CORRECTION

Patent No. 3,601,807 Dated August 24, 1971

Inventor(s) William F. Beausoleil, Wilbur D. Pricer

It is certified that error appears in the above-identified patent and that said Letters Patent are hereby corrected as shown below:

Column 2, line 46, the words "the level" should be deleted. Column 4, line 62, the words "A synchronous" should read --Asynchronous--. Column 19, line 66, the word "of" second occurrence should read --for--.

Signed and sealed this 18th day of January 1972.

(SEAL)
Attest:

EDWARD M.FLETCHER,JR.
Attesting Officer

ROBERT GOTTSCHALK
Acting Commissioner of Patents